United States Patent
Downey (10) Patent No.: US 9,551,979 B1
(45) Date of Patent: Jan. 24, 2017

(54) METHOD OF MUSIC INSTRUCTION

(71) Applicant: Patrick M. Downey, Bangor, ME (US)

(72) Inventor: Patrick M. Downey, Bangor, ME (US)

(*) Notice: Subject to any disclaimer, the term of this patent is extended or adjusted under 35 U.S.C. 154(b) by 0 days.

(21) Appl. No.: 15/169,803

(22) Filed: Jun. 1, 2016

(51) Int. Cl.
*G04F 5/02* (2006.01)
*G09B 15/00* (2006.01)

(52) U.S. Cl.
CPC .............. *G04F 5/025* (2013.01); *G09B 15/00* (2013.01); *G10H 2220/096* (2013.01)

(58) Field of Classification Search
CPC .... G04F 5/025; G09B 15/00; G10H 2220/096
See application file for complete search history.

(56) References Cited

U.S. PATENT DOCUMENTS

| | | | | |
|---|---|---|---|---|
| 5,447,089 A * | 9/1995 | Marrash | G09B 15/00 | 84/484 |
| 5,555,306 A * | 9/1996 | Gerzon | G10K 15/12 | 381/63 |
| 5,999,630 A * | 12/1999 | Iwamatsu | H04S 1/002 | 381/17 |
| 7,030,308 B2 * | 4/2006 | Yagi | G09B 15/00 | 84/484 |
| 8,278,542 B2 * | 10/2012 | Kashioka | G04F 5/025 | 84/484 |
| 9,116,509 B2 * | 8/2015 | Takahashi | G04F 5/025 | |
| 2004/0234076 A1 * | 11/2004 | Agostini | H04S 1/00 | 381/18 |
| 2006/0070511 A1 * | 4/2006 | Parsons | G04F 5/025 | 84/730 |
| 2006/0070512 A1 * | 4/2006 | Parsons | G04F 5/025 | 84/730 |
| 2006/0070513 A1 * | 4/2006 | Parsons | G04F 5/025 | 84/730 |
| 2011/0083544 A1 * | 4/2011 | Rogitz | G04F 5/025 | 84/484 |

FOREIGN PATENT DOCUMENTS

| | | |
|---|---|---|
| IT | WO 03015471 A2 * | 2/2003 |
| WO | WO/03/015471 | 2/2003 |

* cited by examiner

Primary Examiner — Robert W Horn
(74) Attorney, Agent, or Firm — Anthony D. Pellegrini (57) ABSTRACT

A method of music instruction utilizing a system capable of producing two or more sounds perceived by the user as originating in specific locations in three-dimensional space relative to the user, with the system comprising a user interface, a sound generator, a transmitter, and a monitoring device, and the method comprising the steps of obtaining the system; interacting with the user interface of the system to provide instruction to the sound generator; interacting with the monitoring device; generating the one or more sounds perceived to be emanating from some location in three-dimensional space based on the instruction provided; transmitting output signals to the monitoring device; and perceiving the sounds by means of the monitoring device, with the method being practiced at the same time that the user either plays or does not play a musical instrument.

30 Claims, 3 Drawing Sheets

METHOD OF MUSIC INSTRUCTION

BACKGROUND OF THE INVENTION

Technical Field

The present invention relates generally to the field of instruction of musicians. More particularly, the present invention is directed to a method of instruction using a virtual metronome that gives the musician the perception of audible sounds emanating from various locations in three-dimensional space.

Description of Prior Art

Musicians have traditionally used many different methods for learning and improving their musicianship. One such method is to employ a metronome to maintain a steady beat during practice of a musical instrument. A metronome is a mechanical or electronic device that makes repeated audible sounds at an adjustable pace, used for marking rhythm. Metronomes measure time in beats per minute. Metronomes allow the user to vary the tempo of the beats by increasing or decreasing the beats per minute generated by the metronome. The metronome was first patented in 1815 by Johann Maelzel as a tool for musicians under the title "Instrument Machine for the Improvement of all Musical Performance, called Metronome."

Metronomes come in mechanical, electronic, and software forms. A mechanical metronome typically has a pendulum arm that swings back and forth to an adjustable tempo. The very first metronomes were mechanical, and they remain popular even today. However, due to cost and accuracy improvements, electronic metronomes have become the standard.

There is a huge variety of electronic metronomes on the market. Electronic metronome models range from the very simple to the very elaborate. Simple electronic metronomes duplicate in electronic format the function of the mechanical metronome. More elaborate electronic metronomes incorporate sounds and clicks to denote musical meter and subdivided rhythmic groups. Some electronic metronomes assist the musician with a visual representation of when the beat will sound. Finally, the most elaborate electronic metronomes will record and analyze the musician's timing and rhythm and provide a visual depiction and breakdown of how accurate the musician is.

Software based metronomes provide the musician with all of the options available with mechanical and electronic metronomes, but with the audible sounds being controlled and generated by a computer.

A metronome is used by musicians to keep an exact and steady tempo when practicing. Use of a metronome during practice increases the musician's sense of rhythm and timing. Practicing scales, various music drills, or a piece of music to a metronome assists musicians in developing a more precise and accurate sense of time. Use of a metronome assists in learning consistency of tempo and rhythmic beats, and can be incorporated into a practicing technique wherein the metronome is set to progressively higher speeds. Sheet music often has metronome markings that show the speed at which the work should be played. Similarly, when recording music, metronomes are used to set click tracks, which then allow musicians to separately play the different parts of a work which are then synchronized to the click track.

Regular practice with a metronome allows a musician to work on fundamentals, drills, and music while simultaneously building a more precise perception and execution of rhythm and timing. The regular pulse of the metronome creates an external reference point that allows the practicing musician to compare and adjust his or her own rhythm and time to the external reference point. Metronome use can be built into a musician's practice sessions as the musician sees fit. The metronome does not have to be the central focus of a practice session or exercise or drill. The benefits of using a metronome in terms of building a more precise sense of rhythm and time are there for a musician even if the metronome is in the background of the musician's focus during a given practice session.

The metronome thus assists the musician with improving the perception of rhythm and time as made manifest in music's beats/pulse, subdivisions, and meter. Existing metronomes easily facilitate practice regimes, exercises, and drills meant to boost a musician's precision. Existing metronomes allow a musician to make improvement in these areas the centerpiece and focus of a given practice. Use of metronomes in any practice session often has the secondary benefit of improving a musician's sense of rhythm and time.

Notwithstanding the foregoing, existing metronomes are quite limited as a pedagogical tool across the many other aspects of sound and music. They do not assist in the developing of precise perceptions by the musician of other fundamental components and dimensions of sound and music. Existing metronomes do not measure and create an external reference point for the spatial aspects of sound, the distance and placement aspects of sound, the shape aspects of sound, the movement aspects of sound, the volume and crescendo/decrescendo aspects of sound (e.g., emanation and decay aspects of sound), the dynamic aspects of sound, the color/timbral aspects of sound, the pitch/frequency aspects of sound, the harmonic and non-harmonic aspects of sound, or the orchestration aspects of sound.

It is therefore shown that there is a need for a method of music instruction that allows the musician practice tools for addressing multiple aspects of music and sound.

It is thus an object of the present invention to provide a method of music instruction that allows the musician practice tools for addressing multiple aspects of music and sound.

It is a further object of the present invention to provide a method of music instruction that uses an improved metronome.

It is yet a further object of the present invention to provide a method of music instruction that allows the musician to perceive metronomic sounds in various locations in three-dimensional space.

It is yet a further object of the present invention to provide a method of music instruction that allows the musician to perceive metronomic sounds that dynamically move through three-dimensional space.

It is yet a further object of the present invention to provide a method of music instruction that allows the musician to perceive metronomic sounds that manifest the Doppler Effect.

It is yet a further object of the present invention to provide a method of music instruction that allows the musician to customize the experience of perceiving metronomic sounds that are located in and dynamically move through three-dimensional space.

Other objects of the present invention will be readily apparent from the description that follows.

SUMMARY OF THE INVENTION

The method of music instruction of the present invention overcomes the deficiencies of traditional metronomes by using a specialized system that creates and dynamically manipulates multiple sounds in three-dimensional space. This allows multiple aspects of sound and music to be measured, practiced, and improved upon by the musician. The method allows the practicing musician to make any one of the aspects of sound and music, or a combination of aspects, the centerpiece or focus of a practice session, exercise, or drill. The method also allows the practicing musician to simply go about his or her standard practice regimes while improving perception and cognition regarding these aspects as a secondary benefit. Moreover, the method described herein may be used without the practicing musician playing an instrument; that is, metronomic practice alone may be advantageous to the musician.

The method allows the practicing musician to program aspect settings to be applied during a practice session. The system used by the method may contain pre-set aspects and combinations of aspects, as well as allowing ad hoc custom programming of aspect characteristics. These pre-sets will be designed to cover the fundamentals of the aspects of sound and music. The custom programming of the aspects and combinations of aspects can be tailored to the unique practice schedule and goals of the musician. The method thus allows for great variation in programming to meet the needs of every musician.

In the method of the present invention, the basic metronome 'click' is expanded to accomplish the measurement and enhancement of perception of the basic aspects as follows:

Spatial aspects of sound: the click is perceived by the musician as being located in and emanating from different places within three-dimensional spherical sonic space. A basic pre-set will have the click rotate in a circumference around the musician. The click may be assigned to move a part of the distance of the circumference every so many clicks or after some pre-defined period of time. The clicks in this pre-set will emanate from the same radial distance in relation to the musician. The radial distance of the circumference can be adjusted to move closer to the musician or further away. The circumference can be axially rotated. This pre-set, at a most basic level, enhances spherical perception of sound. Different patterns in addition to a basic circle are also contemplated as pre-sets. For example, ovals, swirl-like movements, square or triangular movements, and non-linear movement may be used to position the audible sounds in three-dimensional space.

Distance aspect of sound: more explicit focus on distance can be achieved through pre-sets that vary the metronome click to be perceived as moving towards and away from the musician in a straight line. Pre-sets could also have the emanation point vary from side to side, front to back, and up to down. Perception of placement of sound is enhanced by utilizing more than one click at a time with the different clicks placed in front of and behind each other, as well as splayed out across spherical space. The simultaneous perception of multiple clicks could be assigned different timbres or pitches (or both) to differentiate them from each other, with more difficult or advanced pre-sets making the simultaneous clicks less dissimilar to each other.

Shape aspect of sound: the method uses multiple simultaneous clicks and sequential clicks to describe a particular sonic shape, such as a square, a cube, a cylinder, a cone, a triangle, a pyramid, etc.

Movement aspect of sound: the method provides an elaboration and expansion of the above ideas, with pre-sets creating undulations or wave-like patterns across spherical space. Additionally, different sounds are sustained for different time durations, creating a further sense of movement across space. This allows the musician to perceive metronomic sounds that manifest the Doppler Effect.

Volume/(de)crescendo aspect of sound: the method allows for clicks to increase and decrease in volume over time. The speed of gradation can be altered. Reverb variance and other aspects of sound decay may be added to the click.

Dynamic aspect of sound: the method allows for vibrations similar to various forms of instrumental and vocal vibrato, percussiveness, flange, delay, chorus, compression, distortion, and overtones (natural and artificial harmonics) to be expressed.

Color/timbral aspects of sound: timbre is the characteristic quality of a sound, independent of pitch and loudness, from which its source or manner of production can be inferred. Timbre depends on the relative strengths of the components of different frequencies, which are determined by resonance. Timbre, also known as the color of sound, is the most difficult aspect of sound and music to define and isolate in terms of musical acoustics. The method, through altering of the metronomic click and utilizing the widest palette of instrument choices in conjunction with instrument execution techniques, will have a pre-set bank of encyclopedic timbral depth. Through random assignment to the metronomic click or through planned timbral studies with various timbral ranges assigned to the metronomic click during a given practice session, the perception of tonal color possibilities and the precise ascertainment of tonal color in the musician's mind will be enhanced.

Pitch/frequency aspect of sound: the method is capable of altering the pitch of the metronomic click along the well-known twelve tone Western system of music. In a similar manner, the method may alter the clicks along non-Western systems that involve microtones, e.g., the Middle Eastern scale system. The pitch/frequency aspects of the method will have pre-sets and the ability of the user to select pitch variances to study in a given practice session (e.g., a musician may practice a minor second melodic interval by choosing two notes separated by a minor second interval). Random minor second couplets of clicks ranging through the twelve keys can be assigned, or the musician could choose to study specified minor second melodic intervals, or any other combination of melodic intervals and melodic intervallic patterns.

Polyrhythmic/polymeter aspects of sound: The method allows the musician to set the metronomic click to simultaneously represent meter, polymeter, polyrhythm, and other complex aspects of meter and rhythm. The meter of music is its rhythmic structure, the patterns of accents heard in regularly recurring measures of stressed and unstressed beats at the frequency of the music's pulse. Polymeter refers to the simultaneous use of different meters when the measure sizes differ but the beat remains constant. Since the beat is the same, the various meters eventually agree. Polyrhythm is the simultaneous use of two or more conflicting rhythms that are not readily perceived as deriving from one another, or as simple manifestations of the same meter. The system employed in the method will allow the user to study and improve perception about meter, polymeter, polyrhythm, and other complex aspects of meter and rhythm through the use of presets and customization. The sets of metronomic clicks will make use of accents to further amplify and expand understanding of the aforementioned concepts. The system will also allow the user to practice concentrating on one meter or rhythmic pattern while the system, through use of preset metric and rhythmic tracks, deviates grossly and randomly from the meter and rhythmic pattern the user is practicing. The system, after varying periods of deviation, will return to the metric and rhythmic pattern of the practitioner, allowing the user to gauge whether he or she has been able to stay on course with what was being played despite the metric and rhythmic distraction. These aspects pertaining to meter and rhythm can be applied in conjunction with other previously described aspects.

Harmonic aspects of sound: The method allows the musician to set the metronomic click to sound harmonic intervals. Additionally, the method allows the musician to set the clicks to sound chords ranging from two note dyads, triads, four note chords, five note chords, etc. The method allows the musician to set the metronomic clicks to study the aforementioned chords along with all of their inversions. Finally, in terms of harmonic aspects of sound, the method allows the musician to study via assignments to the metronomic click harmonic and chord progressions, including specific types of cadences.

Non-harmonic composite aspects of sound: the method through various assignments to the metronomic click allows the musician to study sound composites of different kinds. This aspect of composites explores combinations of sounds outside of the conventional combinations covered by the orchestration/orchestral aspects of sound, described below. The use of daily objects, machine sounds, technological sounds, etc., is available. A greater precision and depth of perception and appreciation will be awakened in the musician through utilizing this aspect.

Orchestration/orchestral aspects of sound: the method allows the musician to set the metronomic click to various orthodox combinations of sound found in the modern symphonic orchestra. The different sections of the orchestra, both in isolation and in relation to the other sections, will be capable of being explored through the various assignations that the method makes to the metronomic click. Other musical ensembles other than symphonic orchestras, such as bands, chamber ensembles, quartets, and the like, also make use of principles of orchestration, and the method of the present invention applies to such ensembles as well.

The practicing musician who makes regular and disciplined use of the virtual metronome of the method of the present invention will greatly expand and multiply and maximize the benefits of practice. The musician who uses the method will be able to devise an infinite amount of exercises and drills designed to hone in on a particular component of sound and music simultaneous with working on the various technical skills needed for mastery on a particular instrument. With the method, the musician will be able to custom select and create practice sessions where various aspects of sound become the primary and foreground focus of the session. The musician, through utilization of the method's pre-sets or customization, will also be able to have aspects of sound in the background of focus for a given practice session so that the musician is subconsciously enhancing various perceptual capacities while concentrating on standard music practice goals and objectives. The method, by maintaining all of the functions of the most advanced electronic and software based metronomes, will be for the serious and disciplined practicing musician a means for developing and increasing perceptual and cognitive precision regarding all of the fundamental components of sound and music.

Other features and advantages of the method of the present invention are described below.

DETAILED DESCRIPTION OF THE INVENTION

Figure 1:
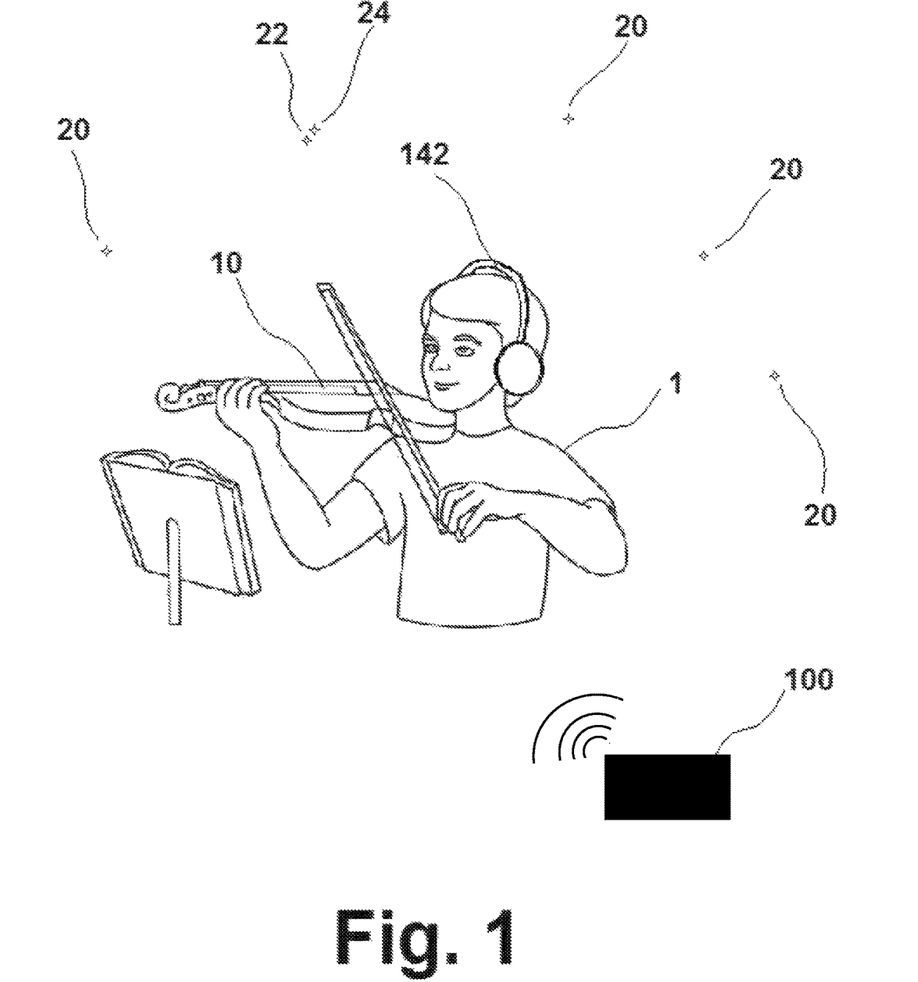
FIG. 1 is a schematic depiction of a musician practicing the method of the present invention by playing an instrument while perceiving sounds generated by the system as located in three-dimensional space.

The method of music instruction disclosed in the present invention requires the use of a specialized system 100 capable of producing two or more distinct sounds 20 perceivable by the user 1, with each of the two or more sounds 20 perceived by the user 1 as originating in a specific location in three-dimensional space relative to the user 1. See FIG. 1. For example, one of the sounds 20 produced by the system 100 may be perceived by the user 1 as being located directly in front of the user 1, while another of the sounds 20 produced by the system 100 may be perceived by the user 1 as being located off to the left of the user 1. The system 100 itself is comprised of a user interface 110, a sound generator 120, a transmitter 130, and a monitoring device 140. See FIG. 2.

Figure 2:
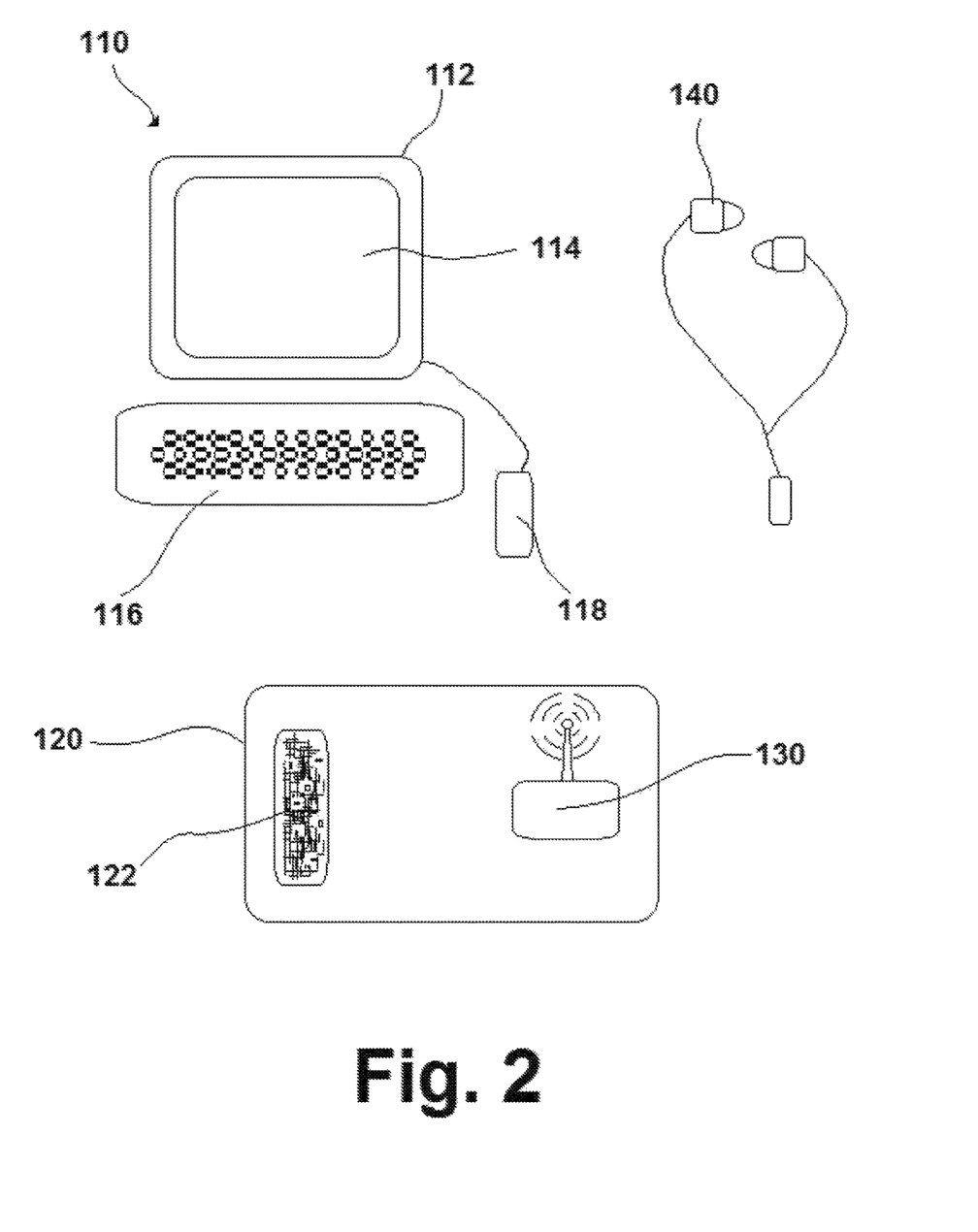
FIG. 2 is a schematic depiction of components of the system used by the method of the present invention.

The user interface 110 may be any user interface 110 known in the art capable of allowing a person to provide instruction to the system 100 regarding characteristics of how the two or more sounds 20 are to be perceived by the user 1 in three-dimensional space. The user interface 110 also must be capable of allowing the instruction to be processed by the sound generator 120. In one embodiment, the user interface 110 comprises a computer 112 and a computer monitor 114, a keyboard 116, and/or a computer mouse 118. The user interface 110 may use a touch screen computer monitor 114 in lieu of a keyboard 116 and/or a computer mouse 118, or a touch screen computer monitor 114 may be used together with a keyboard 116 and/or a computer mouse 118. The user interface 110 may be a simple keypad data entry device. In some embodiments the user interface 110 will have predefined input elements which correspond to predefined instructions to be provided to the system 100 by the user 1. These predefined input elements may be menu options displayed on a computer monitor 114, or dedicated buttons, or mechanical dials or sliders, or any combination of the foregoing. In other embodiments the user interface 110 will accept ad hoc instructions from the user 1, such as a series of codes corresponding to desired characteristics of the two or more sounds 20 to be produced by the system 100. The user interface 110 may also be resident on a mobile computing device, such as a smart phone or a tablet.

The sound generator 120 of the system 100 must be capable of accepting instruction from the user 1 as provided through the user interface 110, and to convert the instructions into output signals suitable for use by the monitoring device 140. The sound generator 120 may comprise an integrated processor 122, whereby the processor 122 is capable of converting the instruction for use by the sound generator 120 to generate the output signals suitable for use by the monitoring device 140. Each of the two or more output signals must comprise information sufficient to create audible sounds 20 perceivable by the user 1 as being located in one or more specific locations in three-dimensional space relative to the user 1. In the preferred embodiments the processor 122 is a computing device which uses computer software resident on that computing device. The computing device may alternately use firmware or dedicated microprocessors. In alternate embodiments the processor 122 is a separate component in communication with the sound generator 120.

While the sound generator 120 may employ any known technology for creating audible sounds 20 perceivable by the user 1 as being located in one or more specific locations in three-dimensional space relative to the user 1, in one embodiment the sound generator 120 uses head-related transfer functions and reverberations. (A head-related transfer function is a response that characterizes how the human ear receives a sound from a specific location in three-dimensional space. Much like stereoscopic vision, binaural sound—slightly different sounds directed at the left and right ears of a listener—when synthesized from a head-related transfer function, can cause the perception of location.) Examples of three-dimensional sound generators are the MorrowSoundTrue3D™ and the A&G 3D-EST™. Similarly, studio mixing board consoles can be used to simulate three-dimensional sound location through the manipulation of panning knobs, volume controls, spread slider controls, doppler level controls, and other mixing controls.

The monitoring device 140 must be capable of expressing the output signals produced by the sound generator 120 in a manner capable of being perceived by the user 1 as an audible sound 20 located in one or more specific locations in three-dimensional space relative to the user 1. In one embodiment the monitoring device 140 comprises one or more audio speakers. The one or more audio speakers may be wired to the sound generator 120 or may be wireless. In another embodiment the monitoring device 140 is a pair of headphones 142. The headphones 142 may be wired to the sound generator 120 or may be wireless. In yet another embodiment the monitoring device 140 is a pair of wireless earbuds.

The transmitter 130 provides the interface between the sound generator 120 and the monitoring device 140. As such, it must be capable of transmitting the output signals from the sound generator 120 to the monitoring device 140. Where the monitoring device 140 comprises one or more wired audio speakers, or a wired headphone 142, the transmitter 130 comprises one or more wires. Where the monitoring device 140 comprises one or more wireless audio speakers, or a wireless pair of headphones 142, or a pair of wireless earbuds, the transmitter 130 is a wireless transmitter capable of wirelessly transmitting signals to the monitoring device 140, using any known technology, including radio frequency transmission, Bluetooth™, wifi, wiMAX, and the like.

In one preferred embodiment of the system 100, the user interface 110, the sound generator 120, and the transmitter 130 are integrated into a single unit.

Figure 3:
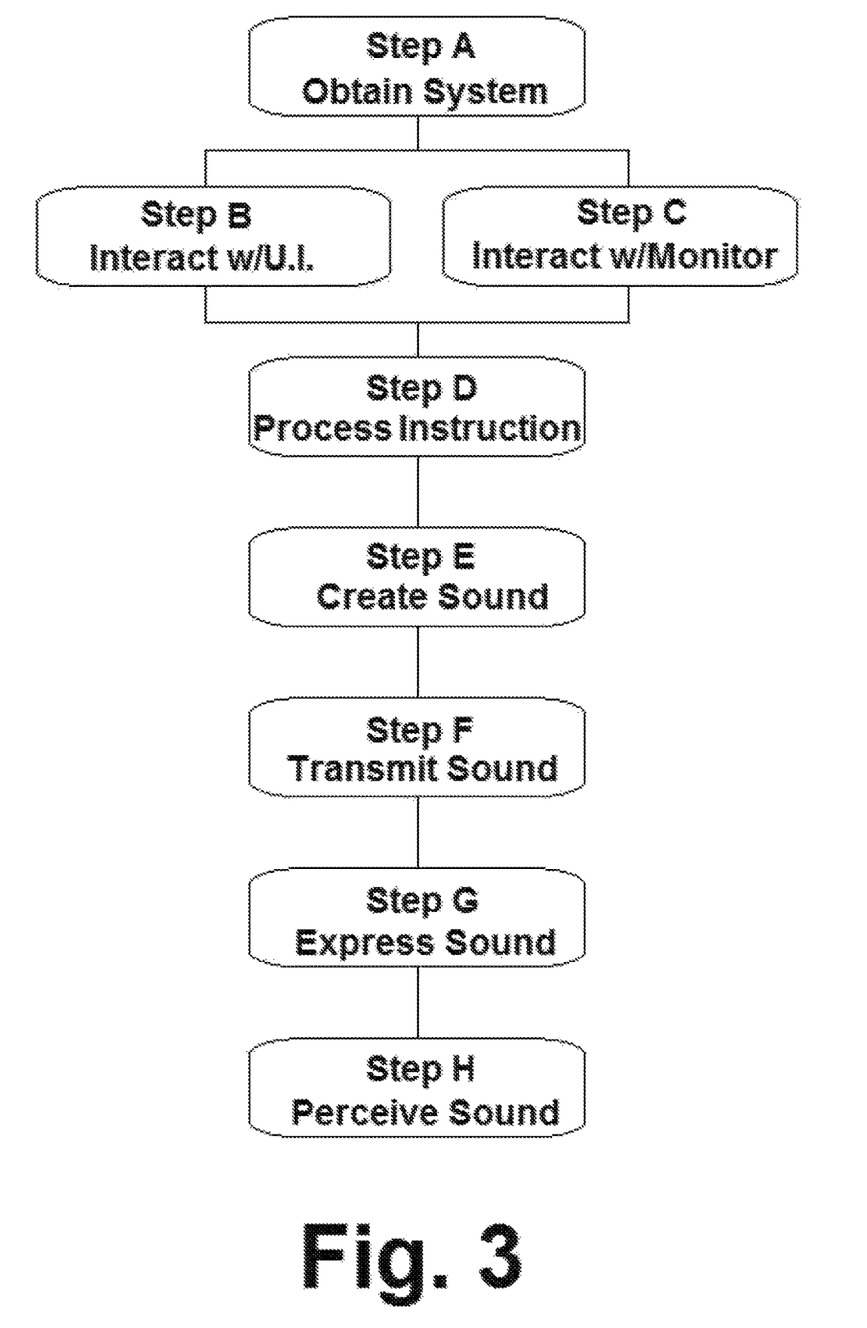
FIG. 3 is a flowchart depicting the basic steps of the method of the present invention.

The method of music instruction of the present invention comprises the following steps, see FIG. 3:

Step A: obtain the system 100 described above.

Step B: a system operator interacts with the user interface 110 of the system 100 to provide instruction to the system 100 regarding how the two or more sounds 20 are to be perceived by the user 1 in three-dimensional space. The system operator may interact with the user interface 110 of the system 100 by selecting from two or more predefined instruction options, with each predefined instruction option comprising instruction to the system 100 regarding how two or more sounds 20 are to be perceived by the user 1 in three-dimensional space. The characteristics of how the two or more sounds 20 are perceived by the user 1 in three-dimensional space differ at least in part across each predefined instruction option. Alternatively, the system operator may interact with the user interface 110 of the system 100 by entering ad hoc instructions, with the ad hoc instructions providing information to the system 100 regarding how two or more sounds 20 are to be perceived by the user 1 in three-dimensional space. In some embodiments the system operator is a person other than the user 1; in other embodiments the system operator and the user 1 are the same person.

Step C: the user 1 interacts with the monitoring device 140 in a manner which allows the user 1 to perceive the two or more sounds 20 expressed by the monitoring device 140. Where the monitoring device 140 comprises a pair of headphones 142 or a pair of earbuds, this step comprises the user 1 placing the headphones 142 over the user's 1 ears, or placing the earbuds into the user's 1 ears, as the case may be. Where the monitoring device 140 comprises one or more audio speakers, the user interaction of Step C may be simply to be attentive to any sounds 20 that emanate from the one or more audio speakers.

Step B and Step C may be performed in any order in relation to the other.

Step D: the system operator causes the sound generator 120 to begin processing the instruction provided in Step B. Step D may be a discrete step from Step B, or it may automatically commence upon the completion of Step B without further input from the system operator.

Step E: the sound generator 120 accepts the instruction from the user interface 110 and converts the instruction into two or more output signals suitable for use by the monitoring device 140. Each of these two or more output signals comprises information sufficient to allow the sound generator 120 to create output signals suitable to be acted upon by the monitoring device 140 to create audible sounds 20 perceivable by the user 1.

Step F: the transmitter 130 transmits the two or more output signals from the sound generator 120 to the monitoring device 140.

Step G: the monitoring device 140 expresses the two or more output signals in a manner capable of being perceived by the user 1 as two or more audible sounds 20 located in one or more specific locations in three-dimensional space relative to the user 1.

Step H: the user 1 perceives the two or more audible sounds 20, wherein there is an interval of silence between one of the two or more audible sounds 20 perceived by the user 1 and at least one other of the two or more audible sounds 20 perceived by the user 1.

In the preferred embodiments, the method further comprises Step I, in which the user 1 plays a musical instrument 10. Step H and Step I may be performed in any order or simultaneously in relation to the other.

The method of music instruction of the present invention may further comprise one or more of the following characteristics:

Each of the two or more audible sounds 20 of Step G may be perceived by the user 1 as being located in a single specific location in three-dimensional space relative to the user 1. This characteristic of the method replicates a traditional metronome, although this virtual metronome may be located anywhere in three-dimensional space relative to the user 1.

Alternatively, at least one of the two or more audible sounds 20 of Step G may be perceived by the user 1 as moving from one specific location in three-dimensional space relative to the user 1 to another specific location in three-dimensional space relative to the user 1 over a period of time.

In yet another alternative, at least one of the two or more audible sounds 20 of Step G is perceived by the user 1 as having a variable volume over a period of time. This may involve an increasing volume, a decreasing volume, or a volume which both increases and decreases over time. This characteristic of variable volume may be combined with the characteristic of movement through three-dimensional space described above.

In yet another alternative, at least one of the two or more audible sounds 20 of Step G is perceived by the user 1 as having a variable pitch over a period of time. This may involve an increasing pitch, a decreasing pitch, or a pitch which both increases and decreases over time. This characteristic of variable pitch may be combined with any one or more of the characteristics described above.

In yet another alternative, at least one of the two or more audible sounds 20 of Step G is perceived by the user 1 as having variable tone over a period of time. This may involve an increasing tone, a decreasing tone, or a tone which both increases and decreases over time. This characteristic of variable tone may be combined with any one or more of the characteristics described above.

In yet another alternative, at least one of the two or more audible sounds 20 of Step G is perceived by the user 1 as having variable timbre over a period of time. This may involve an increasing timbre, a decreasing timbre, or a timbre which both increases and decreases over time. This characteristic of variable timbre may be combined with any one or more of the characteristics described above.

In yet another alternative, one of the two or more audible sounds 20 perceived by the user 1 in Step H is a first sound 22 and another of the two or more audible sounds 20 perceived by the user 1 in Step H is a second sound 24. The first sound 22 and the second sound 24 may be simultaneously perceived by the user 1 in Step H. Alternatively, the first sound 22 may be perceived by the user 1 as being located in a location in three-dimensional space relative to the user 1 different from a perceived location of the second sound 24 in three-dimensional space relative to the user 1. Or, at least one of the two or more audible sounds 20 of Step G may be perceived by the user 1 as having a duration different from that of at least one other of the two or more audible sounds 20 perceived by the user 1, or a volume different from that of at least one other of the two or more audible sounds 20, or a pitch different from that of at least one other of the two or more audible sounds 20, or a tone different from that of at least one other of the two or more audible sounds 20, or a timbre different from that of at least one other of the two or more audible sounds 20, or any combination of one or more of the foregoing characteristics.

What has been described and illustrated herein is a preferred embodiment of the method of music instruction of the present invention, along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. A method of music instruction,
said method utilizing a system capable of producing two or more sounds perceivable by a user, each said two or more sounds perceived by the user as originating in a specific location in three-dimensional space relative to said user,
said system comprising a user interface, a sound generator, a transmitter, and a monitoring device,
wherein said user interface is capable of allowing a system operator to provide instruction to said system regarding characteristics of how the two or more sounds are to be perceived by the user in three-dimensional space,
said user interface is further capable of allowing the system operator to cause said instruction to be processed by said sound generator,
said sound generator is capable of accepting the instruction from the user interface and converting said instruction into two or more output signals suitable for use by said monitoring device, each of said two or more output signals comprising information sufficient to create an audible sound perceivable by the user as being located in one or more specific locations in three-dimensional space relative to the user,
said monitoring device is capable of expressing each of said two or more output signals in a manner capable of its being perceived by the user as an audible sound located in one or more specific locations in three-dimensional space relative to the user, and
said transmitter is capable of transmitting said two or more output signals from said sound generator to said monitoring device;
said method comprising the following steps:
Step A: obtain said system;
Step B: the system operator interacts with the user interface of the system to provide instruction to said system regarding how the two or more sounds are to be perceived by the user in three-dimensional space;
Step C: the system operator causes the sound generator to begin processing the instruction provided by the system operator in Step B;
Step D: the sound generator converts said instruction into two or more output signals suitable for use by the monitoring device, each of said two or more output signals comprising information sufficient to create an audible sound perceivable by the user as being located in one or more specific locations in three-dimensional space relative to the user;
Step E: the transmitter transmits said two or more output signals from said sound generator to said monitoring device;
Step F: the monitoring device expresses said two or more output signals in a manner capable of being perceived by the user as two or more audible sounds located in one or more specific locations in three-dimensional space relative to the user;
Step G: the user interacts with the monitoring device in a manner which allows the user to perceive the two or more sounds expressed by the monitoring device; and
Step H: the user perceives the two or more audible sounds, wherein there is an interval of silence between one of the two or more audible sounds perceived by the user and at least one other of the two or more audible sounds perceived by the user.

2. The method of claim 1 further comprising the following step:
   Step I: the user plays a musical instrument;
   whereby Step H and Step I may be performed in any order or simultaneously in relation to the other.

3. The method of claim 1 wherein the sound generator of the system further comprises an integrated processor,
   said processor being a computing device capable of accepting instruction from the system operator provided through the user interface and converting said instruction by use of computer software resident on said computing device into information suitable for use by said sound generator.

4. The method of claim 1 wherein the system further comprises a processor,
   said processor being a computing device capable of accepting instruction from the system operator provided through the user interface and converting said instruction by use of computer software resident on said computing device into information suitable for use by said sound generator, said processor being an independent component from said sound generator.

5. The method of claim 1 wherein the system operator interacts with the user interface of the system in Step B by selecting from two or more predefined instruction options, each said predefined instruction option comprising instruction to said system regarding how two or more sounds are to be perceived by the user in three-dimensional space;
   whereby the characteristics of how the two or more sounds are perceived by the user in three-dimensional space differ at least in part for each predefined instruction option.

6. The method of claim 1 wherein the system operator and the user are the same person.

7. The method of claim 1 wherein each of the two or more audible sounds of Step F is perceived by the user as being located in a single specific location in three-dimensional space relative to the user.

8. The method of claim 1 wherein at least one of the two or more audible sounds of Step F is perceived by the user as moving from one specific location in three-dimensional space relative to the user to another specific location in three-dimensional space relative to the user over a period of time.

9. The method of claim 1 wherein at least one of the two or more audible sounds of Step F is perceived by the user as having a variable volume over a period of time.

10. The method of claim 1 wherein at least one of the two or more audible sounds of Step F is perceived by the user as having a variable pitch over a period of time.

11. The method of claim 1 wherein at least one of the two or more audible sounds of Step F is perceived by the user as having variable tone over a period of time.

12. The method of claim 1 wherein at least one of the two or more audible sounds of Step F is perceived by the user as having variable timbre over a period of time.

13. The method of claim 1 wherein one of the two or more audible sounds perceived by the user in Step H is a first sound and another of the two or more audible sounds perceived by the user in Step H is a second sound, with the first sound and the second sound being simultaneously perceived by the user in Step H.

14. The method of claim 13 wherein in Step H the first sound is further perceived by the user as being located in a location in three-dimensional space relative to the user different from a perceived location of the second sound in three-dimensional space relative to the user.

15. The method of claim 13 wherein at least one of the two or more audible sounds of Step F is perceived by the user as having a duration different from a duration of at least one other of the two or more audible sounds perceived by the user.

16. The method of claim 1 wherein at least one of the two or more audible sounds of Step F is perceived by the user as having a duration different from a duration of at least one other of the two or more audible sounds perceived by the user.

17. The method of claim 1 wherein at least one of the two or more audible sounds of Step F is perceived by the user as having a volume different from a volume of at least one other of the two or more audible sounds perceived by the user.

18. The method of claim 1 wherein at least one of the two or more audible sounds of Step F is perceived by the user as having a pitch different from a pitch of at least one other of the two or more audible sounds perceived by the user.

19. The method of claim 1 wherein at least one of the two or more audible sounds of Step F is perceived by the user as having a tone different from a tone of at least one other of the two or more audible sounds perceived by the user.

20. The method of claim 1 wherein at least one of the two or more audible sounds of Step F is perceived by the user as having a timbre different from a timbre of at least one other of the two or more audible sounds perceived by the user.

21. The method of claim 1 wherein the user interface comprises a computer and at least one of the following group: a computer monitor, a keyboard, a computer mouse, and a touch screen computer monitor.

22. The method of claim 1 wherein the user interface comprises a touch screen.

23. The method of claim 1 wherein the user interface comprises a keypad data entry device.

24. The method of claim 1 wherein the monitoring device is a pair of headphones, and the user interaction with the monitoring device in Step G comprises the user placing the pair of headphones onto the user's head over the user's ears.

25. The method of claim 1 wherein
   the monitoring device is a pair of wireless headphones,
   the transmitter is a wireless transmitter capable of providing the two or more output signals from the sound generator to the wireless headphones, and
   the user interaction with the monitoring device in Step G comprises the user placing the pair of wireless headphones onto the user's head over the user's ears.

26. The method of claim 1 wherein
   the monitoring device is a pair of wireless earbuds,
   the transmitter is a wireless transmitter capable of providing the two or more output signals from the sound generator to the wireless earbuds, and
   and the user interaction with the monitoring device in Step G comprises the user placing the wireless earbuds into the user's ears.

27. The method of claim 1 wherein the user interface, the sound generator, and the transmitter are integrated into a single unit.

28. The method of claim 4 wherein the user interface, the processor, the sound generator, and the transmitter are integrated into a single unit.

29. The method of claim 1 wherein the instruction provided by the system operator to the system in Step B is selected by the system operator from one or more preset instructions.

30. The method of claim 1 wherein the instruction provided by the system operator to the system in Step B is customizable by the system operator.

\* \* \* \* \*